May 20, 1952  R. S. ROOT  2,597,380

VIBRATION DAMPENING MOTION TRANSMITTING ELEMENT OR CLUTCH

Filed July 27, 1948

INVENTOR.
ROBERT S. ROOT
BY *Bodell E. Thompson*
Attorneys

Patented May 20, 1952

2,597,380

UNITED STATES PATENT OFFICE 2,597,380

VIBRATION DAMPENING MOTION TRANSMITTING ELEMENT OR CLUTCH

Robert S. Root, Syracuse, N. Y., assignor to Lipe-Rollway Corporation, Syracuse, N. Y., a corporation of New York Application July 27, 1948, Serial No. 40,884

1 Claim. (Cl. 64—27)

This invention relates to vibration absorbing means for motion transmitting elements and particularly for the driven clutch elements used in the clutches of motor vehicles for transmitting the motion of the crank shaft of the engine to the propeller shaft of a motor vehicle, and has for its object a particularly simple vibration or torque dampening motion transmitting means and the assembly thereof between inner and outer parts of the motion transmitting element.

The invention consists in the novel features and in the combinations and constructions hereinafter set forth and claimed.

In describing this invention, reference is had to the accompanying drawings in which like characters designate corresponding parts in all the views.

Figure 1:
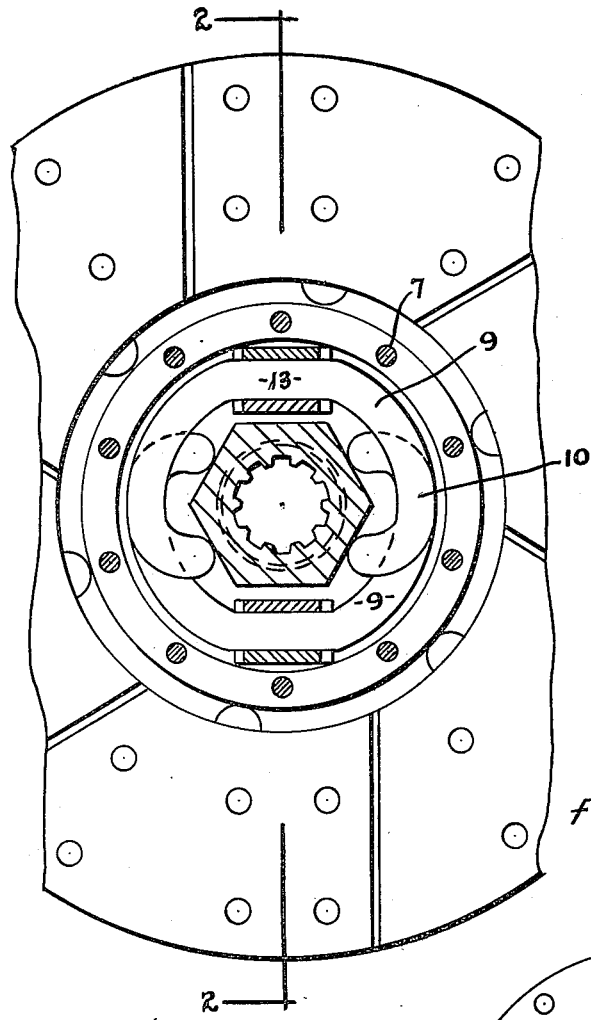
Figure 1 is a fragmentary side elevation, partly in section, of a clutch plate or driven member embodying this invention.
Figure 2:
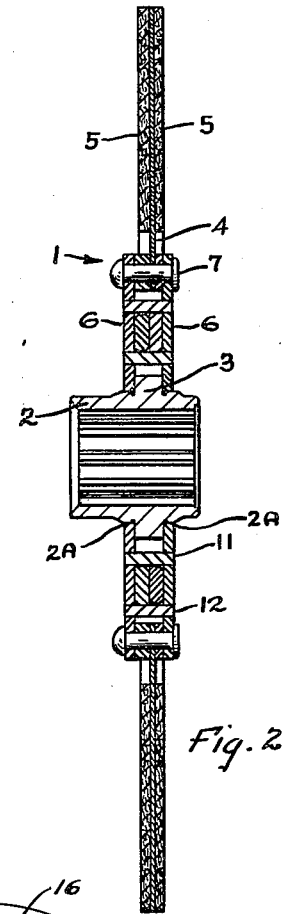
Figure 2 is a section on line 2—2, Figure 1.
Figure 4:
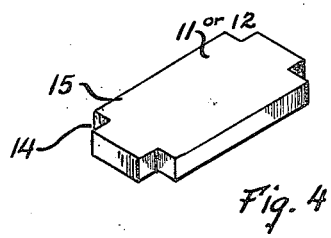
Figure 4 is an isometric view of one of the retaining plates for the vibration dampening member.
Figure 3:
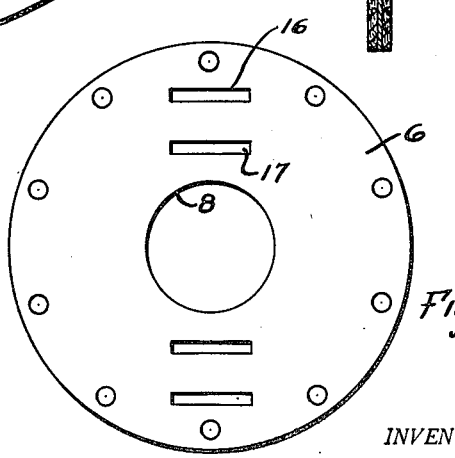
Figure 3 is an elevation of one of the side plates of the clutch which holds the vibration dampening members in position.

The motion transmitting element to which the vibration dampener is shown as applied is the driven clutch member of a friction clutch and includes a concentrically arranged outer part or disk 1 and a driven part or hub 2, the vibration dampening member being located to transmit the motion from the driving part to the driven part. The hub 2 is internally splined for mounting upon a clutch shaft and is provided with a peripheral cam shaped surface 3 on a peripheral collar 2A on the hub. The cam surface is here shown as hexagonal. The outer part, or disk 1, comprises a clutch plate 4 having friction faces 5 on opposite sides thereof, and inner side plates 6 secured to the inner margin of the plate 4, as by rivets 7. The side plates 6 have an axial circular opening 8 on the hub 2 on opposite sides of the collar 4. As here shown, there are a plurality of oppositely disposed motion transmitting members.

9 designates said motion transmitting members, each being C-shaped in general form and embracing the cam surface of the inner member, and each being biased to grip the cam surface at the low points of the cams, that is midway between the corners of the hexagonal formation. Each member 9 is secured intermediate of the C formation to the side plates 6. Preferably, the end portions of the oppositely disposed members 9 overlap each other as at 10. The intermediate portions of each member 9 are secured to the side plates 6 as by inner and outer or radially spaced retaining plates 11 and 12 which embrace an intermediate straight portion 13 of each member 9. Each retaining plate is oblong in general form and formed with cut-outs 14 at its corners providing elongated lengthwise extending lugs 15 for entering inner and outer radially spaced slots 16 and 17 in the plates 6. The elongated lugs 15 may be spread or riveted. As here shown, filler plates or shims are used to fill the excess space between each member 9 and the side plates 6. However, if but one member 9 were used, or a plurality were used but which did not lap, the members 9 could entirely fill the space between the side plates 6.

Owing to the arrangement of the members 9, they all act in unison in the same way during vibratory movement of the inner and outer parts 1, 2, and during vibration their inner ends ride from the low points of the cams toward the high points or corners of the hexagon, and vice versa.

What I claim is:

A motion transmitting element comprising inner and outer concentrically arranged parts, the outer part comprising an annular plate having friction faces on opposite sides thereof, side plates secured to the inner margin of the former plate and mounted on the inner part to have a slight rotating movement relatively thereto, the inner part having a collar between the side plates and formed with a peripheral cam surface, a resilient vibration dampener and motion transmitting members between said parts and mounted between said side plates, said members being C-shaped in general form and embracing the cam surface of the inner part and secured at its intermediate portion to the outer part between said side plates, the ends of the C formation coacting with the cam surface of the inner part, said member being biased to cause the ends of the C formation to grip the cam surface normally at the low portions thereof, and retaining plates between said side plates and arranged to hold said member at the intermediate portion of its C formation, the side plates having slots therein and the retaining plates having lugs for entering the slots.

ROBERT S. ROOT.

REFERENCES CITED

The following references are of record in the file of this patent:

UNITED STATES PATENTS

| Number | Name | Date |
|---|---|---|
| 621,136 | Rasmussen | Mar. 14, 1899 |
| 1,959,213 | Nygard | May 15, 1934 |
| 1,966,948 | Forsythe | July 17, 1934 |

FOREIGN PATENTS

| Number | Country | Date |
|---|---|---|
| 693,259 | Germany | 1940 |